(12) United States Patent
Buelna et al.

(10) Patent No.: US 7,887,706 B2
(45) Date of Patent: Feb. 15, 2011

(54) METHOD OF BIOFILTRATION OF A LIQUID EFFLUENT

(76) Inventors: Gerardo Buelna, 2040, rue Nadeau, Québec (Québec) (CA) G1P 2S4; Yann Le Bihan, 1440, rue Onésime-Voger, app. 101, Québec (Québec) (CA) G1Y 3L1; Rino Dube, 253, rue Janequin, Québec (Québec) (CA) G1B 3R3; Paul Lessard, 465, rue Learmonth, Québec (Québec) (CA) G1S 1P7; Caroline Dufour-L'Arrivee, 4, chemin du Barrage, Lac Beauport (Québec) (CA) G3B 0Z8

( * ) Notice: Subject to any disclaimer, the term of this patent is extended or adjusted under 35 U.S.C. 154(b) by 79 days.

(21) Appl. No.: 12/415,166

(22) Filed: Mar. 31, 2009

(65) Prior Publication Data

US 2009/0242482 A1    Oct. 1, 2009

Related U.S. Application Data

(60) Provisional application No. 61/161,602, filed on Mar. 19, 2009.

(30) Foreign Application Priority Data

Mar. 31, 2008    (CA) .................................. 2626911

(51) Int. Cl.
C02F 3/00    (2006.01)
(52) U.S. Cl. ...................... 210/617; 210/620
(58) Field of Classification Search .............. 210/610, 210/615–617, 620–630
See application file for complete search history.

(56) References Cited

U.S. PATENT DOCUMENTS

| 4,253,966 | A |   | 3/1981 | Lebesgue et al. |
| 4,696,747 | A |   | 9/1987 | Verstraete et al. |
| 4,983,299 | A | * | 1/1991 | Lupton et al. ............... 210/617 |
| 5,290,451 | A |   | 3/1994 | Koster et al. |
| 5,387,344 | A |   | 2/1995 | McCombs et al. |
| 5,906,746 | A | * | 5/1999 | Helmo et al. ............... 210/614 |
| 6,100,081 | A |   | 8/2000 | Buelna |
| 6,866,779 | B1 |   | 3/2005 | Burke |
| 6,936,170 | B2 |   | 8/2005 | Shieh et al. |
| 7,374,683 | B2 |   | 5/2008 | Buelna et al. |

(Continued)

OTHER PUBLICATIONS

Aubry et al., "Nitrogen Behavior in a Trickling Biofilter Treating Pig Manure.", Biofilm Systems Conference IV, Sep. 24-27, 2006, Aquatech, Amsterdam, Holland.

(Continued)

*Primary Examiner*—Chester T Barry
(74) *Attorney, Agent, or Firm*—Ogilvy Renault, LLP (57) ABSTRACT

A method of biofiltration of a liquid effluent by simultaneous nitrification and denitrification uses the adding of an oxygen source at a predetermined rate and optionally the adding of a carbon source (such as whey) thus enabling the complete transformation of the nitrates ($NO_3$) present in the effluent at the time of treatment through a biofilter. The specific operating conditions favoring the simultaneous nitrification and denitrification include the controlled injection of a slight quantity of air, adjustment of the level of nitrogen load ($TKN+NO_3$) and the level of carbon load thereby making possible elimination for the most part of the release of unwanted nitrogen in the form of $NO_3$ or $NO_2$.

22 Claims, 6 Drawing Sheets

U.S. PATENT DOCUMENTS

2007/0221573 A2   9/2007   Mailath et al.

OTHER PUBLICATIONS

Boiran B. et al., 1996, "Nitrification and denitrification of liquid lagoon piggery waste in a biofilm infiltration-percolation aerated system (BIPAS) reactor.", Bioresource Technology, vol. 55, No. 1, 63-77.

Park K. Y. et al., 2000, "Emission and Control of Nitrous Oxide from a Biological Wastewater Treatment System with Intermittent Aeration.", Journal of Bioscience and Bioengineering, vol. 90, No. 3, 247-252.

Beline F. et al., 2001, "Application of the N technique to determine the contributions of nitrification and denitrification to the flux of nitrous oxide from aerated pig slurry.", Wat. Res., vol. 35, No. 11, pp. 2774-2778.

Alvarado-Lassman A. et al., 2006, "Simultaneous removal of carbon and nitrogen in an anaerobic inverse fluidized bed reactor.", Water Science & Technology, vol. 54, No. 2, pp. 111-117.

Rodriguez L. et al., 2007, "Use of agro-food wastewaters for optimization of the denitrification process.", Water Science & Technology, vol. 55, No. 10, pp. 63-70.

Menoud P, et al., 2006, "Simultaneous Nitrification and Denitrification using Siporax tm Packing.", Wat Sci. Tech., vol. 40, No. 4-5, pp. 153-160.

Torsten W. 1998, "Adsorption and Denitrification in Nitrifying Trickling Filters.", Wat. Res., vol. 33, No. 6, pp. 1500-1509.

Garzon-Zuniga M. A. et al., 2007, "Aeration effect on the efficiency of swine manure treatment in a trickling filter packed with organic materials.", Water Science & Technology, vol. 55, No. 10, pp. 135-143.

* cited by examiner

METHOD OF BIOFILTRATION OF A LIQUID EFFLUENT

BACKGROUND OF THE INVENTION

The treatment of heavy concentrations of nitrogen contained in a waste liquid effluent such as liquid pig manure (1 600 to 3 100 mg TKN/L) can give rise to substantial quantities of transformation byproducts, such as nitrates. When the treated liquid manure is released directly into the environment by means of a cleaning field, the authorities are increasingly scrutinizing the nitrogen concentrations in the effluents and more harsh standards are being examined, such as that reported by Dubé et al. in "Adaptation et Demonstration du procédé BIOSOR$^{MD}$—Lisier dans une ferme porcine du type finisseur", *Vecteur Environnement*, 38(4), July (2005) 20-25. Thus, the work of transformation should be pushed to its limit to achieve very low nitrogen concentrations (e.g.: <20 mg N—$NH_4$/L, <100 mg N—$NO_3$/L) exiting the system.

With the technology of biofiltration on organic substrate, treatment of the liquid pig manure for a release into the environment is generally done by using two consecutive stages (primary biofilter and polishing biofilter). In this process, the mechanisms of nitrification ($NH_4 \rightarrow NO_3$) and denitrification ($NO_3 \rightarrow N_2$) take place simultaneously, as discussed by Garzón-Zúñiga et al. in "Nitrogen Elimination Mechanisms in an Aerated Peat Biofilter Treating Pig Manure", *Environ Technol*, 26(4), (2005) 361-371, and by Gilbert et al. in "Nitrifying and Denitrifying Biomass Characterization of an Organic Biofilter Treating Pig Manure", R. Stuetz and T. T. Lim (Editors), *Water and Environmental Management Series—Young Researchers*, (2006) 257-264. However, the very low release constraints for ammoniacal nitrogen ($NH_4$) mean that the nitrification within the primary biofilter needs to be maximized, which can lead to quite elevated concentrations of nitrates at the outlet (on the order of 500 mg N—$NO_3$/L). Consequently, one must promote the denitrification within the polishing biofilter while ensuring a complete transformation of the residual ammoniacal nitrogen. Denitrification by heterotrophic bacteria is accomplished in optimal manner under anoxic conditions and in presence of easily assimilable carbon, as discussed by Beline et al. in "Application of the $^{15}N$ Technique to Determine the Contributions of Nitrification and Denitrification to the Flux of Nitrous Oxide from Aerated Pig Slurry", *Water Research*, 35(11), (2001) 2774-2778. The low load of residual organic matter at the outlet of the primary biofilter and, thus, at the entrance of the polishing filter, appears to limit the denitrification, as mentioned by Aubry et al. in "Nitrogen Behavior in a Trickling Biofilter Treating Pig Manure", *Biofilm Systems Conference VI*, 24-27 Sep. (2006), Aquatech, Amsterdam, Holland, and might account for the low transformations observed in the polishing unit.

The present invention thus proposes conditions of biofiltration adapted to simultaneous nitrification-denitrification in order to produce a substantially purified effluent containing a minimum of nitrogen in all its forms.

SUMMARY OF THE INVENTION

According to a first aspect of the invention, a method is proposed to purify a liquid effluent containing ammoniacal nitrogen, with or without nitrates, by using a trickling biofilter provided with a filtering medium supporting microorganisms capable of lowering the content of ammoniacal nitrogen of the liquid effluent in the presence of oxygen, and microorganisms capable of denitrifying the liquid effluent under substantially anoxic conditions.

According to a second aspect of the invention, a method is proposed to purify a liquid effluent containing ammoniacal nitrogen, with or without nitrates, by simultaneous nitrification and denitrification, said method comprising the addition of oxygen with a flow rate varying from 0.1 to 0.66 m/hour to the trickling biofilter in order to recover a substantially purified effluent at the outlet.

According to a third aspect of the invention, a method is proposed to purify a liquid effluent comprising the following steps: i) feeding the liquid effluent being purified to an entrance of the biofilter at a level of nitrogen load varying between 0.01 and 0.04 kg TKN/$m^2$.day and a carbon load varying between 0.05 and 0.15 kg $BOD_5$/$m^2$.day; ii) adding oxygen; and iii) recovering a substantially purified effluent at an outlet of the biofilter.

According to a fourth aspect of the invention, a method is proposed to purify a liquid effluent comprising the following steps: i) feeding the liquid effluent being purified to an entrance of the biofilter while adjusting the nitrogen load between 0.01 and 0.04 kg TKN/$m^2$.day; i') optionally, adding to the effluent a carbon source at a predetermined load depending on the quantity of nitrogen (TKN) initially contained in the effluent; ii) adding a source of oxygen; and iii) recuperating a substantially purified effluent at an outlet of the biofilter.

According to a fifth aspect of the invention, a method is proposed to purify a liquid effluent comprising the following steps: i) feeding the liquid effluent being purified to an entrance of the biofilter while adjusting the overall nitrogen dosage between 0.01 and 0.055 kg TKN+$NO_3$/$m^2$.day; i') optionally, adding to the effluent a carbon source at a predetermined load depending on the overall quantity of nitrogen (TKN+$NO_3$) initially contained in the effluent; i") letting the effluent trickle through the filtering medium in contact with the carbon source to promote the denitrification of the effluent; ii) adding to the effluent treated at step ii') a source of oxygen; ii') letting the effluent trickle through the filtering medium in contact with the oxygen to lower the content of ammoniacal nitrogen in the effluent; and iii) recovering a substantially purified liquid effluent at an outlet of the biofilter.

DESCRIPTION OF PARTICULAR EMBODIMENTS OF THE METHOD OF THE INVENTION

To implement the method of the invention, the influence of certain operating conditions on management of the ammoniacal nitrogen (and, as the case may be, nitrates ($NO_3$)) in a biofilter was determined, especially the nitrogen load (in the form of TKN), the carbon load (in the form of $BOD_5$) at the process input, and the application of an oxygen feed depending on a predetermined flow rate to complete the purification of the TKN by promoting conditions of simultaneous nitrification and denitrification.

In particular, the method according to the invention involves conditions of simultaneous nitrification and denitrification where the feeding of the liquid effluent being purified is performed at levels of nitrogen load varying between 0.01 and 0.04 kg TKN/m².day; more particularly the level of nitrogen load at step i) varies between 0.015 and 0.035 kg TKN/m².day; even more particularly, level of nitrogen load at step i) varies between 0.02 and 0.035 kg TKN/m².day. Finally, the nitrogen load at step i) is set at about 0.029 kg TKN/m².day.

In the case when the incoming effluent contains nitrates, the nitrogen load can be adjusted to a level of 0.055 kg N/m².day.

These conditions allow for an improvement of the biofiltration so significant that it can be carried out in a single biofilter without the need for a polishing biofiltration stage.

In particular, the method of the invention comprises simultaneous conditions of nitrification and denitrification where the feeding of the liquid effluent being purified is performed at a level of load of a carbon source according to a load varying between 0.05 and 0.15 kg $BOD_5$/m².day; more particularly, the level of load of carbon source at step ii) varies between 0.08 and 0.15 kg $BOD_5$/m².day; even more particularly, the level of load of carbon source at step ii) varies between 0.08 and 0.12 kg $BOD_5$/m².day. Finally, the load of carbon source at step ii) is set at about 0.1 kg $BOD_5$/m².day.

In particular, the oxygen is furnished in the form of pure oxygen, a gas containing oxygen, or air. Air can be ambient air or the contaminated air coming from the pig stable or another source. In particular, the method of the invention comprises simultaneous conditions of denitrification and nitrification where one adds this air at a flow rate varying between 0.5 and 3.3 m/hour.

In particular, when the source of oxygen is air, the rate of aeration at step iii) varies between 1.0 and 3.0 m/hour; even more particularly, the rate of aeration at step iii) varies between 1.5 and 3.0 m/hour. Finally, the rate of aeration at step iii) is set at about 2.5 m/hour.

In particular, the method of the invention comprises conditions of simultaneous nitrification and denitrification where the aeration is continuous or intermittent. More particularly, when the aeration is produced intermittently, the aeration can be implemented by any timetable set by a person skilled in the art, or for example by any aeration timetable between 5 min ON; 10 h OFF and 4 h ON: 4 h OFF.

In particular, the method of the invention comprises conditions of simultaneous nitrification and denitrification where the effluent recovered at the outlet of the biofilter is a substantially purified effluent. In particular, the substantially purified effluent contains between 0 and 200 mg/L; in particular, between 0 and 150 mg/L; more particularly, under 100 mg/L of nitrogen in the form of N—$NO_2$ and N—$NO_3$.

In particular, the method of the invention comprises conditions of simultaneous nitrification and denitrification where the effluent recovered at the outlet of the biofilter is substantially purified. In particular, the substantially purified effluent contains between 0 and 200 mg/L; in particular, between 0 and 150 mg/L; more particularly, under 100 mg/L of TKN.

In particular, in the case when the input effluent contains nitrates, the proposed method can make use of the optional addition of a carbon source at the entrance of the biofilter in order to promote the denitrification so as to significantly reduce the nitrates. The carbon source used can come from a residue of the dairy industry, such as whey, which is the carbon source of choice for denitrification (between 30 000 and 40 000 mg $BOD_5$/L and relatively low contents of other contaminants, including nitrogen). However, another carbon source with low content of contaminants, such as methanol or a sugar such as glucose, can be used.

In particular, the method of the invention allows for an average removal of total nitrogen by about 90 to 100%. More particularly, about 95% of total nitrogen is eliminated.

In particular, the method of the invention comprises conditions of simultaneous nitrification and denitrification where the filtration rate is between 0.01 and 0.3 m³/m².day.

In particular, the method of the invention comprises conditions of simultaneous nitrification and denitrification where optionally, before step iii), steps i'), i"), ii) and/or ii') are repeated at least once.

In particular, the method of the invention comprises conditions of simultaneous nitrification and denitrification where optionally, before step iii), steps i'), i"), ii) and/or ii') can be performed in the order presented, or one of more steps are performed out of order, or they are performed simultaneously, without thereby affecting the effectiveness of the method according to the invention.

In particular, the method of the invention comprises conditions of simultaneous nitrification and denitrification where the filtering medium is at least one element chosen among: pozzolana; peat; wood chips; gravel; and calcite.

EXAMPLES

Example 1

Figure 1:
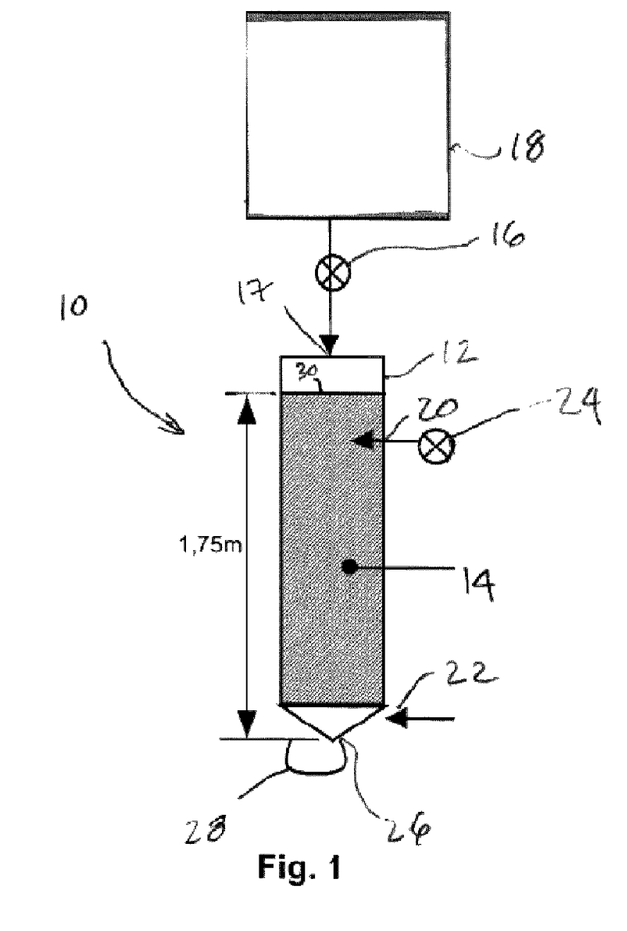
FIG. 1 is a schematic view of one embodiment of a biofilter able to implement the method of the invention.

Experiments with an approximate duration of ten months have revealed the optimal doses for a carbon source added at the inlet (entrance) of a pilot 50 L unit simulating a polishing biofilter, which is generally indicated by the reference number (10) in FIG. 1. The unit (10) in the example shown is made of a column (12) of 20 cm diameter and 2 m height. This column was packed for 1.75 m with organic filtering medium (14) obtained from a polishing biofilter already operating in the field, made up of a filtering medium based on peat and chips, such as that described in U.S. Pat. No. 6,100,081, granted to the present applicant.

The column (12) is fed at the top by means of a pump (16) provided on the unit (10), being adapted to operate in pulsed mode to control the rate of flow of liquid effluent at the entrance (17) of the column (12). A basin (18) preferably maintained at around 4° C. serves as a feed tank for the unit (10), being refilled periodically with the liquid effluent to be purified, coming from a primary biofilter of actual size on the premises. The column (12) has two points of injection (20) and (22), respectively arranged on the upper and lower sections of the column (12). The first point (20), situated at a predetermined distance (e.g. 30 cm) below the surface of the filtering medium (14) in the example shown in FIG. 1, enables a dosed injection of the chosen carbon liquid source (e.g., whey) via a pump (24) provided on the unit (10). In the context of the embodiment depicted, an injection below the surface can prevent overgrowth of biomass during the mixing of the effluent with the carbon source. However, an injection at the surface on the level of the feed line of effluent (17) or any other equivalent means could also be utilized. The second point (22) provides, when deemed necessary, the injection of air into the system opposite the flow of liquid. The outlet (26) for treated effluent is located at the base of the column (12) and is provided with a U-trap (28) in the example shown in FIG. 1, to force the air to circulate through the filtering medium.

During tests, the column was fed at 2 L/day in a mode of one pulsation per hour for the entire duration of the tests. Addition of the liquid carbon source was carried out by dosage of 0.6 L/day. To prevent clogging at the injection point (20), the whey was diluted with water to obtain a solution on the order of 10 000 mg $BOD_5$/L. No air was added during a first period of operation ranging from 0 to 160 days. Then (160 to 240 days), a slight intake of air of about 0.5 m/h was supplied at the injection point (22). To maintain anoxic conditions favorable to the simultaneous nitrification and denitrification, the air feed was then interrupted at a frequency of 5 minutes injection and 10 hours stoppage. Table 1 summarizes the main operating conditions that were used during the tests.

TABLE 1

| Parameter | Characteristic |
| --- | --- |
| Flow rate | 2 L/d (64 L/m²/day) |
| Liquid flow | Descending (trickling) |
| Ascending | Day 0 to 160: 0 m/h |
| aeration | Day 160 to 240: 0.5 m/h (5 min on, 10 h off) |
| Carbon source | Whey at 0.6 L/day (dilution: 3 to 4 times) |

The operation of the unit (10) was monitored on a weekly basis by collecting samples of liquid effluent at the entrance (17) and outlet (26) on a continuous 24 hour basis. The diluted whey was sampled at the injection point (20) on a spot basis.

The main parameters analyzed for the liquid samples taken are the biochemical oxygen demand ($BOD_5$) and the nitrogenous forms (TKN, N—$NH_4$, N—$NO_2$/N—$NO_3$). All techniques used to characterize the samples taken were consistent with the standard methods described in "Standard Methods for Examination of Water and Wastewater", *American Public Health Association (APHA)—American Water Works Association and Water Environment Federation*, 19th Ed., Washington, D.C. (1995) and were performed by accredited laboratories.

Table 2 shows the characteristics of the intrants at the resultant input of the column (12) as measured for 22 samples. The resultant input corresponds to the sum of the effluent of the primary biofilter fed to the entrance (17) and applied to the surface (30) of the filtering medium (14), and the whey added at the injection point (20), considering their respective flow rates.

TABLE 2

| Parameter | Effluent of primary biofilter mean (min-max) | Diluted whey mean (min-max) | Resultant input mean (min-max) | Resultant load |
| --- | --- | --- | --- | --- |
| Q (L/d) | 2 | 0.6 | 2.6 | — |
| $BOD_5$ (mg/L) | 30 (10-160) | 7 800 (4 600-12) | 1 800 (1 100-2) | 0.15 |
| TKN (mg/L) | 130 (61-220) | 260 (180-510) | 160 (100-220) | 0.013 |
| N—$NO_3$ (mg/L) | 630 (340-810) | 0 | 480 (260-630) | 0.04 |

Figure 2:
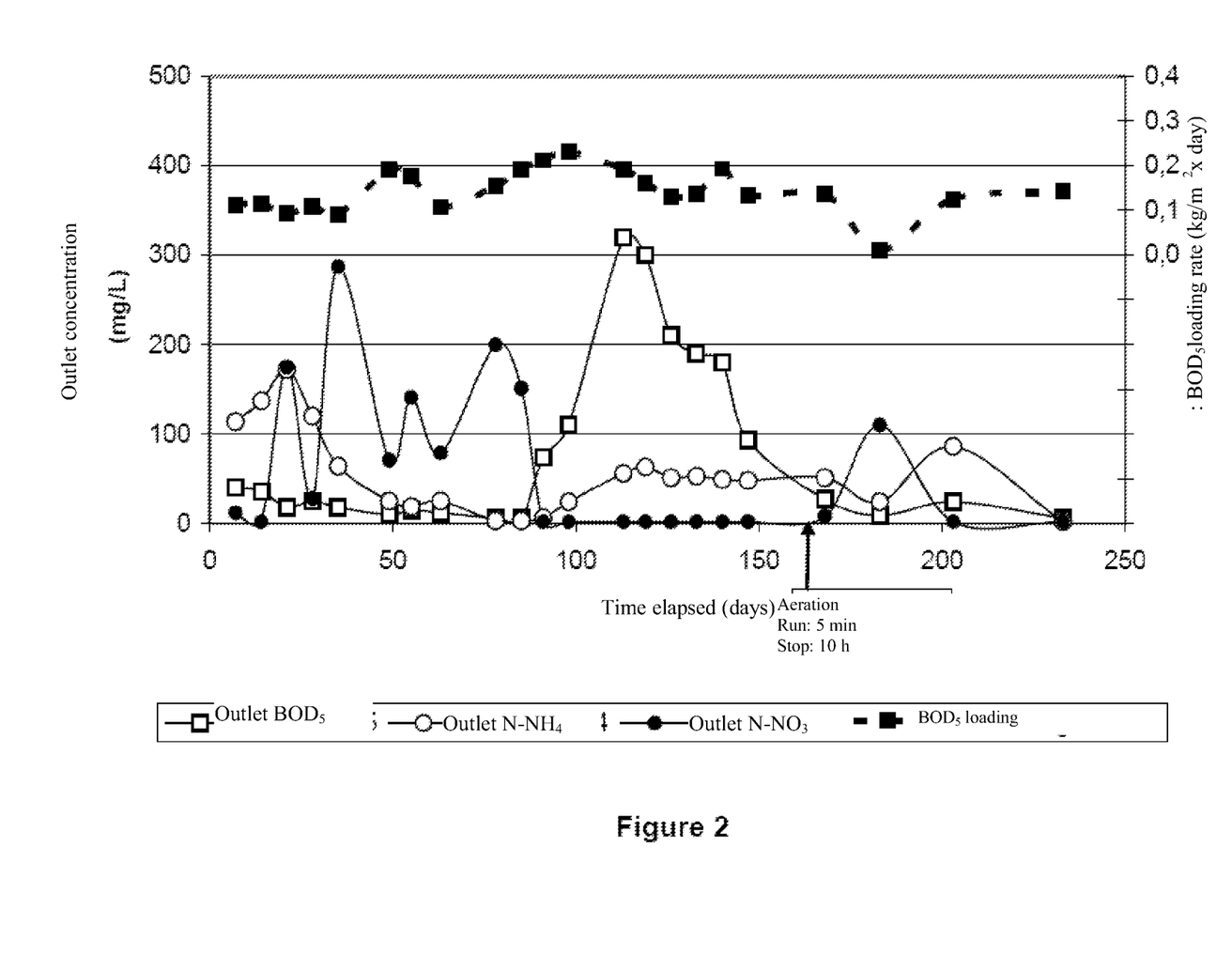
FIG. 2 is a graphic showing the evolution of the outlet concentrations as a function of the $BOD_5$ load applied.

The mean concentrations at the entrance of the column (12), allowing for the addition of whey (resultant input), were 160 mg TKN/L, 1 800 mg $BOD_5$/L and 480 mg N—$NO_3$/L. The graph of FIG. 2 shows the evolution over the duration of the tests of the concentrations of N—$NO_3$, N—$NH_4$ and $BOD_5$ found at the outlet of the column (12), as a function of the $BOD_5$ load applied at the entrance. The incoming $BOD_5$ is expressed as the equivalent applied load, referring to the scale at the right side of the graph. For the nitrogenous forms, TKN is not shown, since it is found entirely in the soluble form $NH_4$ at the outlet. For the nitrites, these were always at zero level.

Overall, the nitrogen abatement (TKN+$NO_3$) was 90%. For the overall time of the tests and for all operating conditions taken together, the carbon/nitrogen ratio "C($BOD_5$)/N" was 3.1. This ratio was calculated by the following formulas, using the load (flow rate×concentration) for each parameter:

$$C = \Sigma BOD_{5\ input} - \Sigma BOD_{5\ output} = 0.98 \text{ kg of } BOD_5 \text{ (or } 31.3 \text{ kg/m}^2\text{)} \quad (1)$$

$$N = ((\Sigma N\text{—}NO_{3\ input} - \Sigma N\text{—}NO_{3\ output}) + (\Sigma TKN_{input} - \Sigma TKN_{output})) = 0.31 \text{ kg of N} \quad (2)$$

The masses of carbon and nitrogen calculated in (1) and (2) correspond respectively to 31.3 kg/m² and 10.0 kg/m² (per unit of surface of filtering medium). This ratio allows us to establish the necessary quantity of $BOD_5$ to transform the overall incoming nitrogen in the form of N—$NO_3$ and TKN to obtain low values of nitrates at the outlet.

The abatement of nitrates was very cyclical, being a function of the variation in the incoming concentrations ($BOD_5$, $NH_4$ and $NO_3$ nitrogen). It turns out that when $BOD_5$ is found at the outlet (e.g., day 100, due to excessive incoming loads), the nitrates are then zero. Analyzing the period without aeration (day 0 to 160), when the load of $BOD_5$ was 0.1 kg/m².d (e.g., the first 50 days), nitrates are present at the outlet. When the load exceeds 0.2 kg $BOD_5$/m².day, very low nitrates are found, but the outlet $BOD_5$ is affected (e.g., day 100). According to the behavior observed between days 110 and 160, a load of 0.15 kg$BOD_5$/m².day allows for a good removal of nitrates while providing a sustained management of the $BOD_5$. Even so, one still finds $NH_4$ at the outlet at a level of 50 mg/L.

Without aeration, we did not achieve a significant transformation of the TKN beyond 65%. The natural entrainment of air caused by the hydraulic circulation seemed inadequate to obtain a high level of nitrification. On day 160, equilibrium was obtained at the outlet of the column with low values for all parameters, but $NH_4$ appeared to stay at values of 50 mg N—$NH_4$/L at the outlet.

To assess the possibility of achieving lower values of $NH_4$, a slight aeration was started on day 160 (5 min per 10 hours).

This slight air feed made it possible to attain very low values of $NH_4$ at the end of the tests. The abatement of nitrates was not affected and the $BOD_5$ remained very low. The rise in nitrates observed on day 180 is rather due to an accidental onetime drop in the carbon load applied. Since this oxygen feed can modify the capacities for management of the $BOD_5$ and $NH_4$, it seems advantageous to control the air intake to ensure conditions favorable to the simultaneous nitrification and denitrification.

Example 2

This example presents the methodology and the results involving the removal of nitrogen under operating conditions favorable to the complete simultaneous nitrification and denitrification.

The pilot biofilters used had a depth of 1.2 m. The filtering media consisted of a mixture of organic (peat and wood chips) and inorganic substrate (pozzolana and calcite). More precisely, the filtering medium contained a coarse layer of 70 cm total depth, beneath which was 25 cm of filtering medium consisting of peat+chips+calcite.

Figure 3:
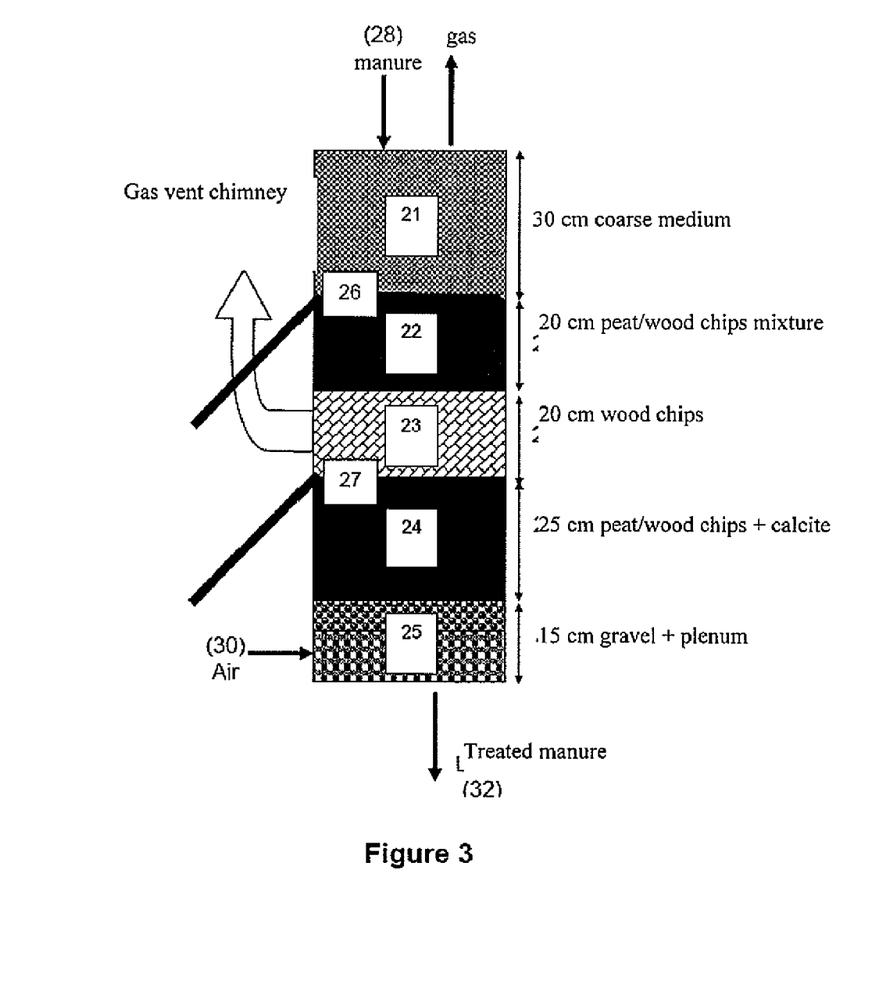
FIG. 3 is a schematic view of another embodiment of a biofilter able to implement the method of the invention, showing the filtering media in cross section.

The layers of filtering medium (21 to 25), as well as the locations of the sampling points (26 and 27), are shown in FIG. 3.

The three pilot biofilters operated countercurrent. The manure was fed at the top of the column (28) and air at the base (30). The air was fed from a compressed air main and the flow rate was regulated with ball type flow meters placed on each of the feed lines. The aeration rate was set at 2.5 m/h during the experiments.

The feedstock manure was pumped by progressive-cavity pumps from storage tanks located in a coldroom at 4° C.

The feeding was discontinuous using several pump pulsations distributed over the course of the day by means of a timer. The duration of the pulsations was regulated to obtain the desired volume per pulse and per day. The timer also made it possible to start the agitators in the manure tanks at the same time as the removal.

The manure passed through preliminary filters, allow it to trap the larger suspended particles so as to avoid clogging of the spray nozzles at the top of the column (28). The spray nozzles distributed the manure over the entire surface of the filtering medium (21). The manure trickled through the filtering medium (21 to 25) by gravity and the treated liquid was recovered at the base of the column (32) and routed to a drain or into containers during the sampling operations.

The biofilters were first conditioned, that is, hydraulically activated until 80% of the water injected is recovered at the outlet. This condition was achieved after around 15 days.

Next, a manure separated under the laths (SSL) coming from a pig farm in Beauce was used to feed the biofilters.

The hydraulic load applied was 0.017 $m^3/m^2$.day (2.2 L/d). The manure feedstock was distributed in the course of the day at a rate of 6 pulses per day of around 367 ml every four hours, as shown by the arrows in the following diagram:

The startup period was considered achieved after 1 month when substantially complete nitrification appeared (presence of nitrite and nitrate and no ammoniacal nitrogen in the effluents).

Figure 4:
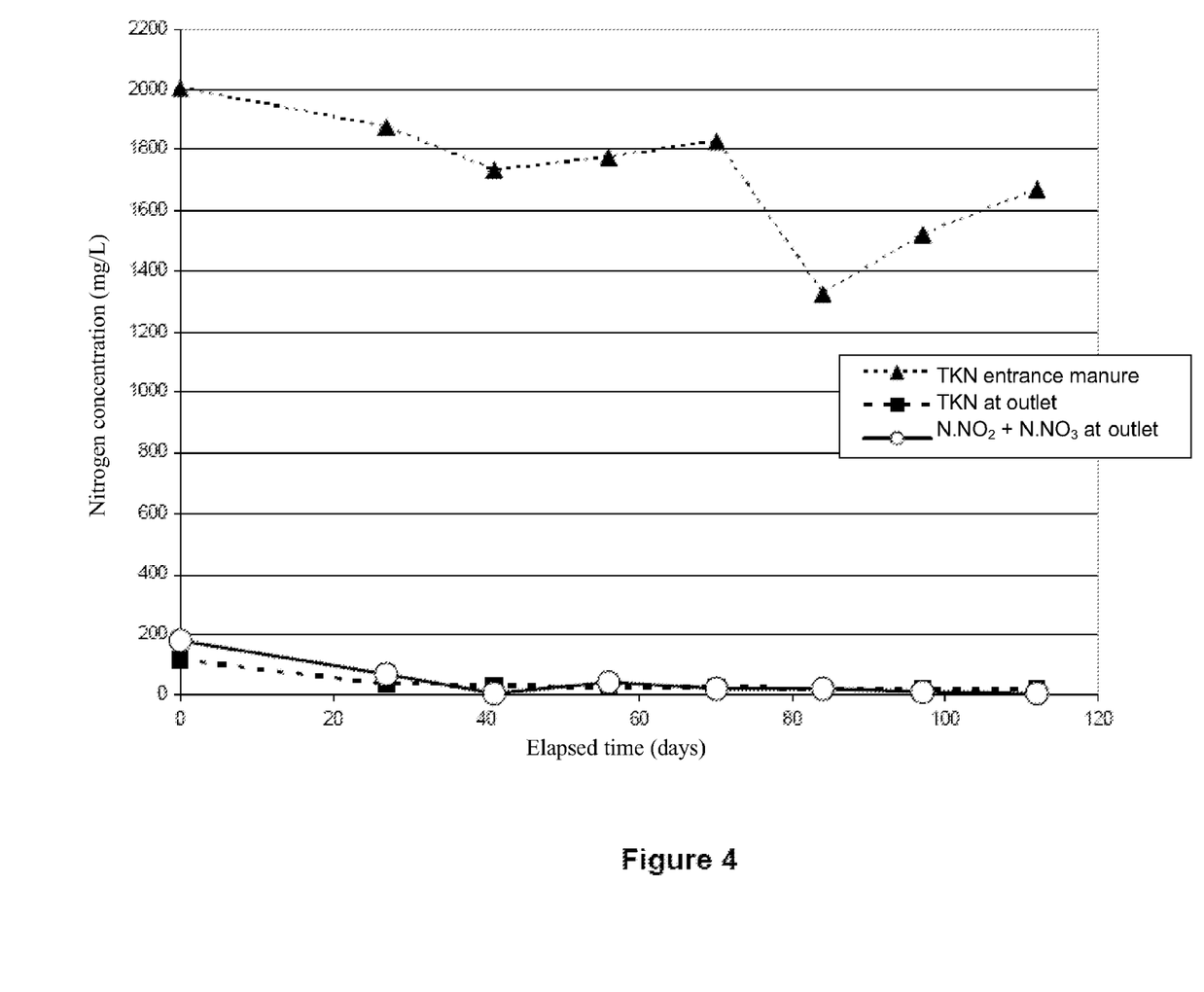
FIG. 4 is a graphic plotting the removal of nitrogen by a "Biosor$^{MD}$—liquid manure" process aerated at 2.5 m/h operating with mean load of TKN and $BOD_5$ of 0.029 kg/$m^2$.day and 0.093 kg/$m^2$.day respectively, i.e. under loads within the conditions of the method of the invention.

The results shown in FIG. 4 show the evolution in nitrogen concentrations during the course of the experiment. The TKN concentration at the intake oscillated between 1300 and 2000 mg/L during the study. At the outlet, the measurement of TKN varied between 19 and 129 mg/L indicating a good abatement of this parameter (>90%). For the concentrations of nitrite and nitrate ($N-NO_2$ and $N-NO_3$), the outlet values expressed as the sum of these two parameters oscillated between 2 and 200 mg/L. Overall, the mean removal of total nitrogen based on the various processes of ammonification, nitrification and denitrification within this continuous aerated process reached values of 95%. In the operating ranges with aeration levels of 2.5 m/h and mean loads of TKN and $BOD_5$ of 0.029 $kg/m^2$.day and 0.093 $kg/m^2$ respectively, the total nitrogen removal is complete (FIG. 4).

Example 3

This example presents the methodology and the results involving the removal of nitrogen under operating conditions unfavorable to complete nitrification-denitrification.

Figure 5:
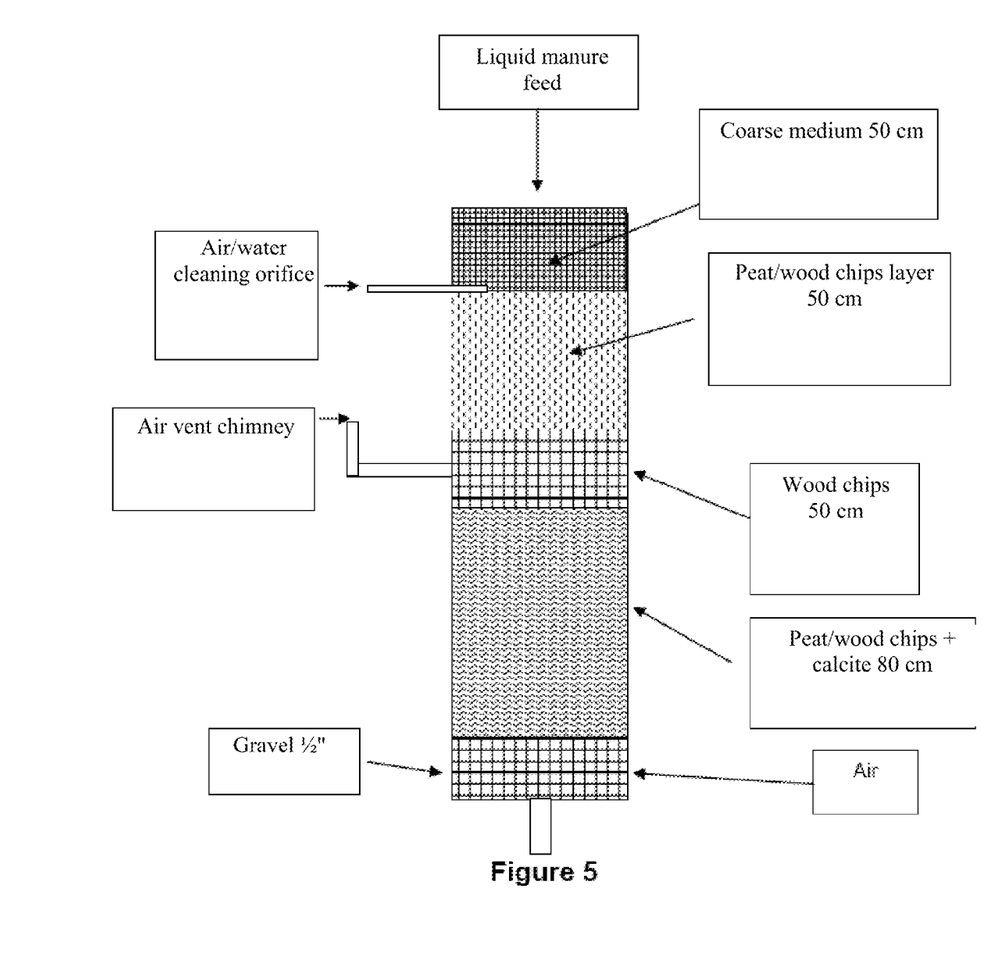
FIG. 5 is a schematic view of a further embodiment of a biofilter able to implement the method of the invention, showing the filtering media in cross section.

FIG. 5 presents a diagram of the biofiltration unit used in this study. This unit of 26.5 cm diameter is 2.30 m in height. The hydraulic load applied was 0.060 $m^3/m^2$.day. The characteristics of the manure being treated have been adjusted and modified as a function of a manure coming from a pig farm in France. For this, the manure from a pig farm (Québec-Canada) was diluted 1.5 times with tap water and an addition of 23 ml of a synthetic solution based on propionic acid (30 g/l), lactic acid (50 g/l), sodium acetate (30 g/l), butyric acid (1 g/l) and ethanol (25 g/l) was added to increase the $BOD_5$. Moreover, 1 692 mg/l of $NH_4HCO_3$ was added to the manure to increase the TKN value. Table 4 below presents the characteristics of this manure.

TABLE 4

| MANURE | SS mg/l | TKN mg/l | $BOD_5$ mg/l |
|---|---|---|---|
| Pig farm in France | 550 | 1 700 | 4 300 |
| Pig farm in Québec. | 200-1 000 | 1 800-2 100 | 3 600-5 600 |
| Manure from Québec diluted and enriched for this study | 215-540 | 1 260-1 713 | 3 600-5 500 |

According to the characteristics obtained from the manure (Table 4), the concentrations obtained were similar to those of the pig farm in France. The concentrations of matter in suspension (SS) were slightly less than the expected values, given large variations in this parameter in different batches of manure.

The operating time of the biofilter was around seven months, so as to allow a good colonization of the filtering medium, as well as observe any changes in the loss of load.

Figure 6:
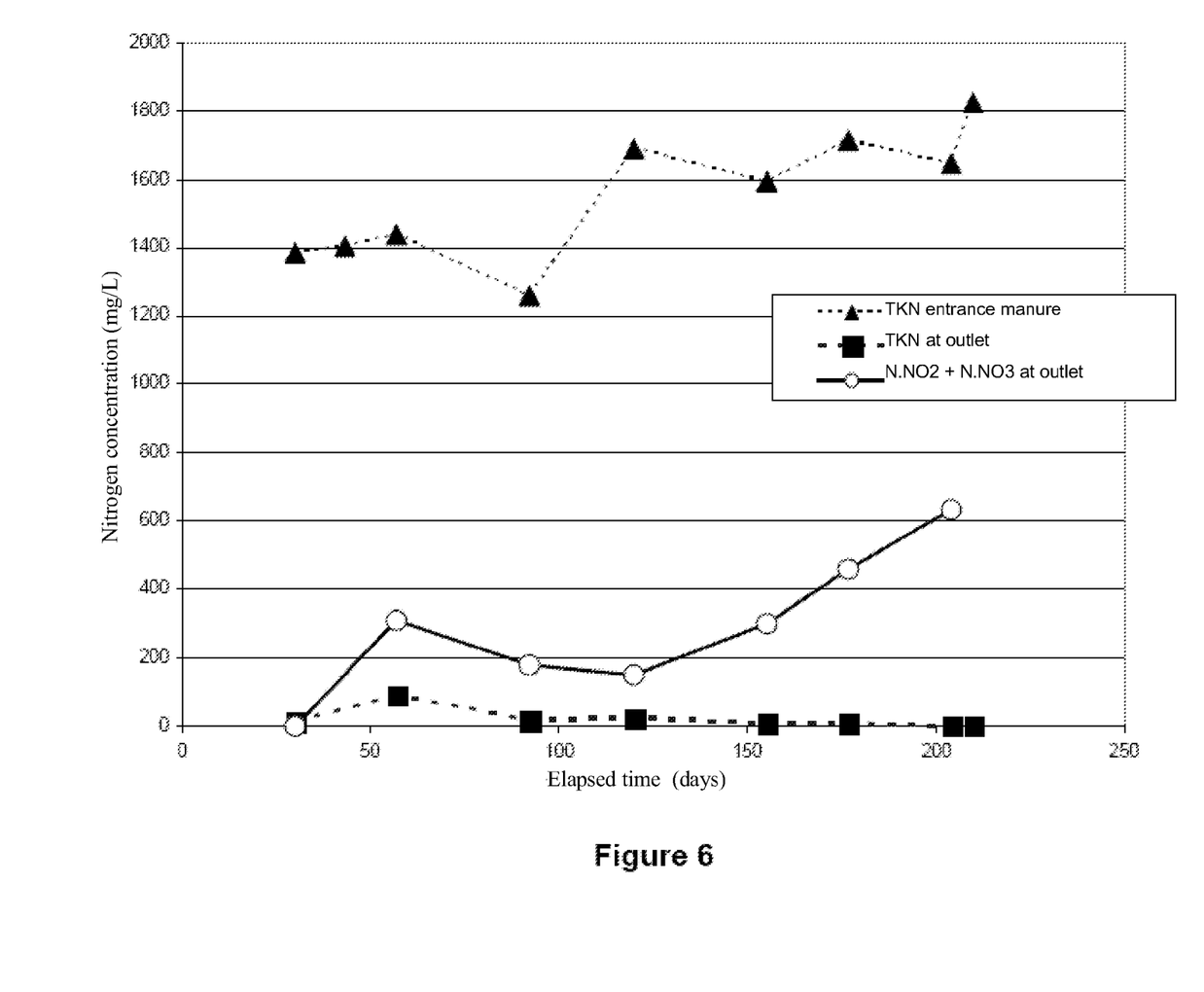
FIG. 6 is a graphic plotting the removal of nitrogen by a "Biosor$^{MD}$ liquid manure" process aerated at 4.5 m/h operating with mean load of TKN and $BOD_5$ of 0.092 kg/$m^2$.day and 0.243 kg/m².day respectively, i.e. under loads outside the conditions of the method of the invention.

The results presented in FIG. 6 show the presence of a strong nitrification in the filtering medium, resulting in an elevated concentration of nitrate generated by the process at the outlet. Under the predefined operating conditions, the denitrification is incomplete for removal of all the nitrates at the outlet. In this case, unlike the method of the invention, a downstream treatment must be provided to further denitrify so as to allow release of the effluent in the environment.

Overall, the mean removal of total nitrogen based on the different processes of ammonification, nitrification and denitrification within this continuous aerated process achieved values of 75%. In the operating ranges at aeration levels of 6.5 m/h and mean loads of TKN and $BOD_5$ of 0.092 kg/m$^2$.day and 0.243 kg/m$^2$.day respectively, the removal of total nitrogen is incomplete (FIG. 6) and reveals a less effective yield for the removal of total nitrogen than the method according to the specific conditions of the invention as presented in example 2.

The invention claimed is:

1. A method for purifying a liquid effluent containing ammoniacal nitrogen, with or without nitrates, by simultaneous nitrification and denitrification, said method comprising the adding of oxygen with a flow rate varying from 0.1 to 0.66 m$^3$/m$^2$.hour to a trickling biofilter in order to recuperate a substantially purified effluent at an outlet of the biofilter.

2. A method according to claim 1, comprising the following steps:
   i) feeding the liquid effluent to be purified to an entrance of the biofilter at a level of nitrogen load varying between 0.01 and 0.04 kg TKN/m$^2$.day and a carbon load varying between 0.05 and 0.15 kg $BOD_5$/m$^2$.day;
   ii) performing said oxygen addition according to said flow rate; and
   iii) recuperating a substantially purified effluent at the outlet of the biofilter.

3. The method according to claim 1, to purify a liquid effluent containing ammoniacal nitrogen, with or without nitrates, wherein said trickling biofilter is provided with a filtering medium supporting microorganisms capable of lowering the content of ammoniacal nitrogen of the liquid effluent in the presence of oxygen, and microorganisms capable of denitrifying the liquid effluent under substantially anoxic conditions.

4. The method according to claim 1, comprising the following steps:
   i) feeding the liquid effluent being purified to an entrance of the biofilter while adjusting the nitrogen load between 0.01 and 0.04 kg TKN/m$^2$.day;
   I') optionally, adding to the effluent a carbon source at a predetermined load depending on the quantity of TKN initially contained in the effluent;
   ii) performing said oxygen addition according to said flow rate; and
   iii) recuperating a substantially purified effluent at the outlet of the biofilter.

5. A method according to claim 1, comprising the following steps:
   i) feeding the liquid effluent being purified to an entrance of the biofilter while adjusting the overall nitrogen load between 0.01 and 0.055 kg TKN+NO$_3$/m$^2$.day;
   I') optionally, adding to the effluent a carbon source at a predetermined dosage depending on the overall quantity of nitrogen (TKN+NO$_3$) initially contained in the effluent;
   I'') letting the effluent trickle through the filtering medium in contact with the carbon source to promote the denitrification of the effluent;
   ii) performing said oxygen addition to the effluent treated at step ii') according to said flow rate;
   ii') letting the effluent trickle through the filtering medium in contact with the oxygen to lower the content of ammoniacal nitrogen in the effluent; and
   iii) recuperating a substantially purified liquid effluent at the outlet of the biofilter.

6. The method according to claim 1, wherein the effluent substantially purified contains between 0 and 200 mg/L of nitrogen in the form of N—NO$_2$ and N—NO$_3$.

7. The method according to claim 6, wherein the effluent substantially purified contains between 0 and 150 mg/L of nitrogen in the form of N—NO$_2$ and N—NO$_3$.

8. The method according to claim 7, wherein the effluent substantially purified contains less than 100 mg/L of nitrogen in the form of N—NO$_2$ and N—NO$_3$.

9. The method according to claim 1, wherein the effluent substantially purified contains between 0 and 200 mg/L of TKN.

10. The method according to claim 9, wherein the effluent substantially purified contains between 0 and 150 mg/L of TKN.

11. The method according to claim 10, wherein the effluent substantially purified contains less than 100 mg/L of TKN.

12. The method according to claim 1, wherein the oxygen is furnished in the form of: pure oxygen or a gas containing oxygen.

13. The method according to claim 12, wherein the oxygen is furnished in the form of air at a rate varying between 0.5 and 3.3 m$^3$/m$^2$.hour.

14. The method according to claim 2, wherein the nitrogen load level at step i) varies between 0.015 and 0.035 kg TKN/m$^2$.day; the load level of carbon source at step i) varies between 0.08 and 0.15 kg $BOD_5$/m$^2$.day; and the oxygen source is in the form of air and the aeration rate at step ii) varies between 1.0 and 3.0 m$^3$/m$^2$.hour.

15. The method according to claim 14, wherein the nitrogen load level at step i) varies between 0.02 and 0.035 kg TKN/m$^2$.day; the load level of carbon source at step i) varies between 0.08 and 0.12 kg $BOD_5$/m$^2$.day; and the aeration rate at step ii) varies between 1.5 and 3.0 m$^3$/m$^2$.hour.

16. The method according to claim 15, wherein the nitrogen load level at step i) is set at about 0.029 kg TKN/m$^2$.day; the load level of carbon source at step i) is set at about 0.1 kg $BOD_5$/m$^2$.day; and the aeration rate at step ii) is set at about 2.5 m$^3$/m$^2$.hour.

17. The method according to claim 1, wherein the filtration rate is between 0.01 and 0.3 m$^3$/m$^2$.day.

18. The method according to claim 1, wherein the aeration is continuous or intermittent.

19. The method according to claim 3, wherein the filtering medium is at least one element selected from the group consisting of: pozzolana; peat; wood chips; gravel; and calcite.

20. The method according to claim 1, wherein said liquid effluent containing ammoniacal nitrogen, with or without nitrates, is liquid manure.

21. The method according to claim 20, wherein said manure comes from the swine industry.

22. The method according to one of claims 4 or 5, wherein the source of carbon load is selected from the group consisting of: whey, methanol, glucose or a liquid manure coming from the farming industry.

* * * * *